United States Patent [19]

Terry

[11] Patent Number: 5,346,631
[45] Date of Patent: Sep. 13, 1994

[54] PHASE SEPARATOR
[75] Inventor: Patrick H. Terry, Middletown, N.J.
[73] Assignee: Exxon Research & Engineering Co., Florham Park, N.J.
[21] Appl. No.: 986,324
[22] Filed: Dec. 7, 1992
[51] Int. Cl.$^5$ ............................................. B01D 21/26
[52] U.S. Cl. .................................. 210/789; 210/519; 210/521
[58] Field of Search ............... 210/513, 521, 522, 519, 210/787, 789

[56] References Cited

U.S. PATENT DOCUMENTS

| | | |
|---|---|---|
| 1,442,689 | 1/1923 | Loss . |
| 1,638,451 | 8/1927 | Nixon . |
| 1,746,253 | 2/1930 | Hawley . |
| 2,378,607 | 6/1945 | Watts . |
| 4,014,671 | 3/1977 | Andro et al. . |
| 4,035,284 | 7/1977 | Gross et al. . |
| 4,313,910 | 2/1982 | Dries et al. . |
| 4,414,100 | 11/1983 | Krug et al. . |
| 4,664,888 | 5/1987 | Castagnos, Jr. . |
| 4,678,642 | 7/1987 | Lee . |

*Primary Examiner*—Frank Spear
*Attorney, Agent, or Firm*—Joseph J. Dvorak

[57] ABSTRACT

The present invention provides an improvement in separating a mixture of two distinct fluid phases of the same or different materials, one dispersed in the other, by ejecting a flowing stream of the mixed fluid phases from a conduit and then deflecting the ejected stream radially outwardly whereby centrifugal and gravitational forces cause the flowing stream to separate with the less dense phase of the two phases forming a top layer and the more dense phase forming a bottom layer and thereafter directing the more dense phase to flow into a conduit leading to a separate chamber.

11 Claims, 3 Drawing Sheets

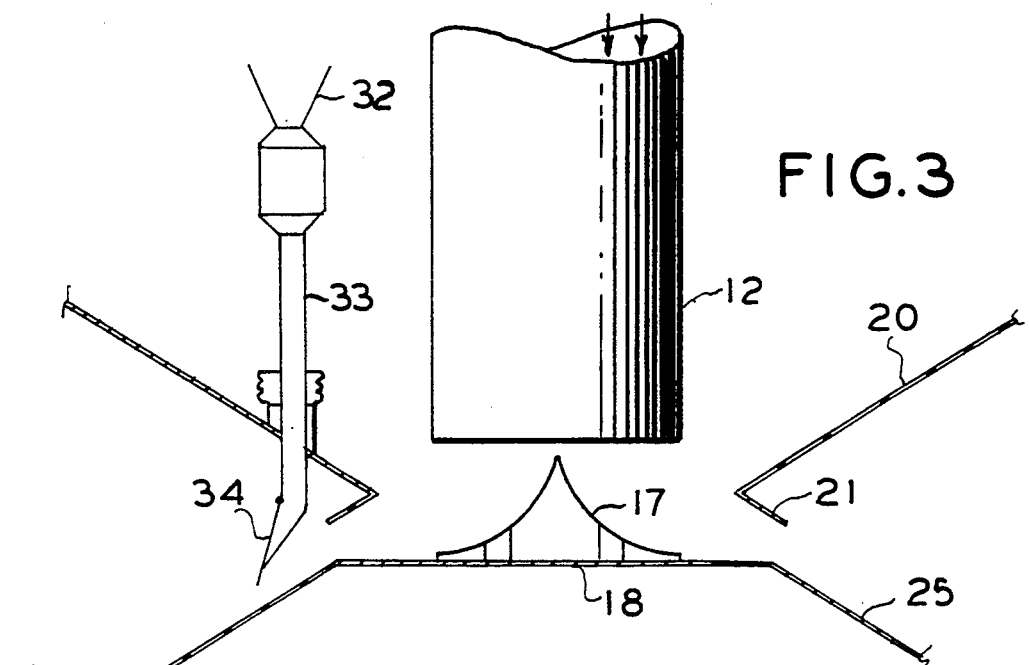
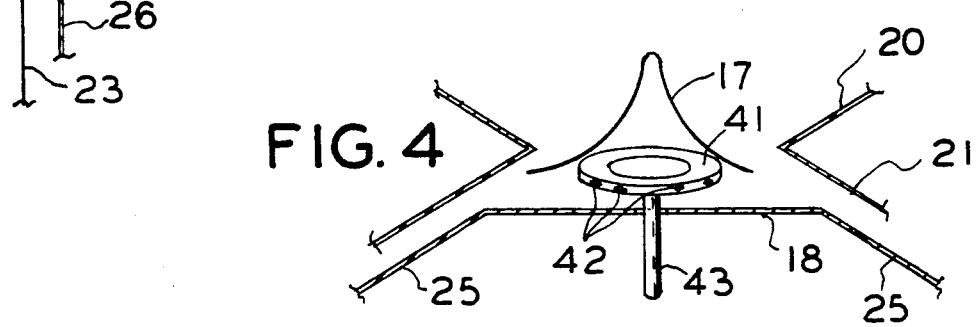
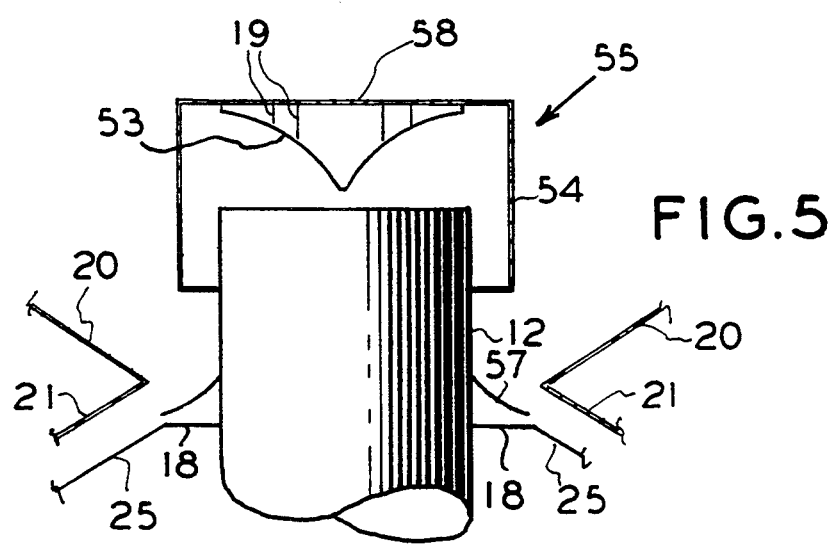

5,346,631

PHASE SEPARATOR

FIELD OF THE INVENTION

The present invention relates to a method and apparatus for separating two distinct fluid phases, especially a liquid or solid phase dispersed in a carrier vapor phase.

BACKGROUND OF THE INVENTION

There are a wide variety of devices known in the art for separating entrained material from a carrier phase which employ cone-shaped deflectors as part of the separator. Notwithstanding the benefits achieved by many of these devices, there remains a continuing need for new and improved methods and apparatus for separating a mixture of two distinct fluid phases.

SUMMARY OF THE INVENTION

Accordingly, the present invention provides an improvement in separating a mixture of two distinct fluid phases of the same or different materials, one dispersed in the other, by ejecting a flowing stream of the mixed fluid phases from a conduit and then deflecting the ejected stream radially outwardly whereby centrifugal and gravitational forces cause the flowing stream to separate with the less dense phase of the two phases forming a top layer and the more dense phase forming a bottom layer and thereafter directing the more dense phase to flow into a conduit leading to a separate chamber.

The apparatus of the present invention includes a flow streamlining deflector which directs the ejected fluid stream radially outwardly and a hydrodynamic sealing ring which directs the more dense phase to flow into a separate chamber.

BRIEF DESCRIPTION OF THE DRAWINGS

FIG. 3 is yet another embodiment of the present invention, showing an alternate positioning of a cyclone dipleg.

FIG. 4 illustrates an embodiment of the present invention including means for delivering a fluid radially outwardly as described hereinafter.

FIG. 5 is a schematic illustration in which upwardly flowing mixed phases are separated by the device of the invention.

DETAILED DESCRIPTION OF THE INVENTION

In order to demonstrate and provide a better understanding of the invention, reference is made to the several drawings and in connection therewith specific mention is made of separating a suspended solids of fluidizable particle size from a carrier gas. It should be appreciated, however, that the invention is applicable to other distinct phases, such as a gas and liquid.

Figure 1:
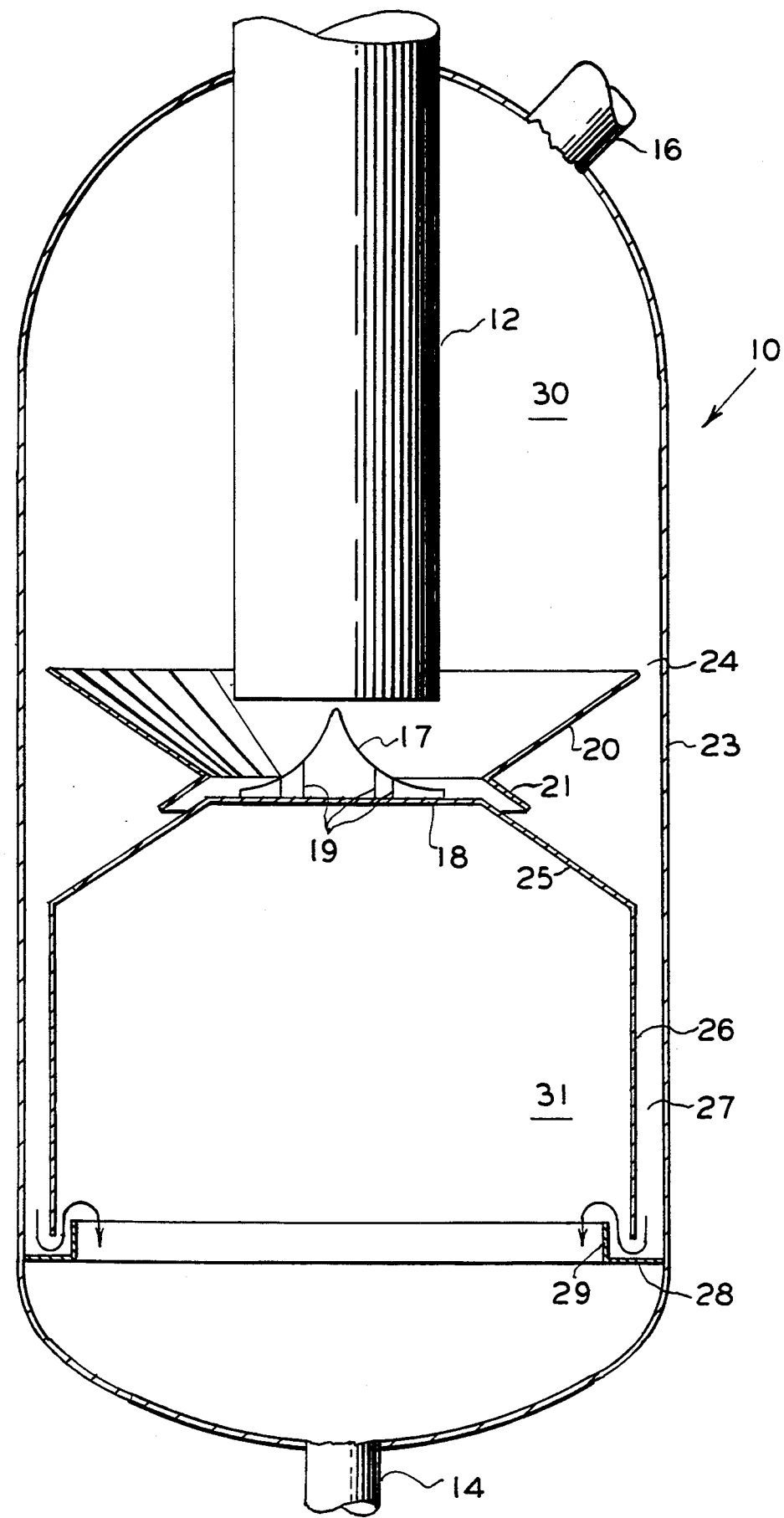
FIG. 1 is a schematic cross-sectional elevation of a vessel having a separation device of the present invention.

Turning first to FIG. 1, there is shown a vessel 10 which includes a generally cylindrical shell 23 in which an entrained solid is separated from a carrier fluid, such as a gas. Vertically and axially disposed within vessel 10 is an inlet conduit 12 for the introduction of a flowing stream of fluid-entrained solids. Vessel 10 is also equipped with an outlet 14 and a top gas outlet 16. Inlet conduit 12 terminates directly above a flow streamlining cone deflector 17, the apex of which is coaxially aligned with the center line of conduit 12. As can be seen in FIG. 1, the deflector cone 17 has generally concave side walls which at the base, face radially outwardly. In the embodiment shown in FIG. 1, cone 17 is supported by means of support struts 19 on a horizontally disposed platform 18 which typically is located at from about one-third to about two-thirds of the distance from the top of the vessel 10. The platform 18 will be a diameter that is less than the diameter of the vessel and generally will be equal to or about three times the diameter of conduit 12. The diameter of the base of cone 17 generally will be equal to or about 20% greater than the diameter of conduit 12. In the preferred embodiment shown in FIG. 1, the diameter of the base of the cone 17 is substantially equal to the diameter of conduit 12. Also as shown in the embodiment in FIG. 1, the apex of the cone 17 is substantially at the exit opening of conduit 12.

A baffle ring 20 extends upwardly and outwardly from a first end positioned at a predetermined distance above the base of cone 17 and terminating at a second end positioned at a predetermined distance from the cylindrical body 23 of vessel 10 so as to define an annular opening 24. Extending downwardly and outwardly from the first end of ring 20 for predetermined distance is hydrodynamic sealing ring 21. As can be seen, sealing ring 21 extends for a short distance beyond the extremity of the platform 18 defining an opening therebetween for passage of the dense phase.

Extending downwardly and outwardly from the horizontal platform 18 is a baffle ring 25, which is joined at its outermost extremity with concentric cylindrical member 26. The member 26 defines with the cylindrical vessel wall 23 an annular stand pipe 27. A horizontally disposed plate 28 with an upwardly extending weir 29 is spaced at the bottom of cylindrical member 26 in such a way as to define a solid seal.

As can be seen, the platform 18 and the baffle rings 20 and 25 effectively separate the vessel 10 into a top section 30 and a bottom section 31.

Figure 2:
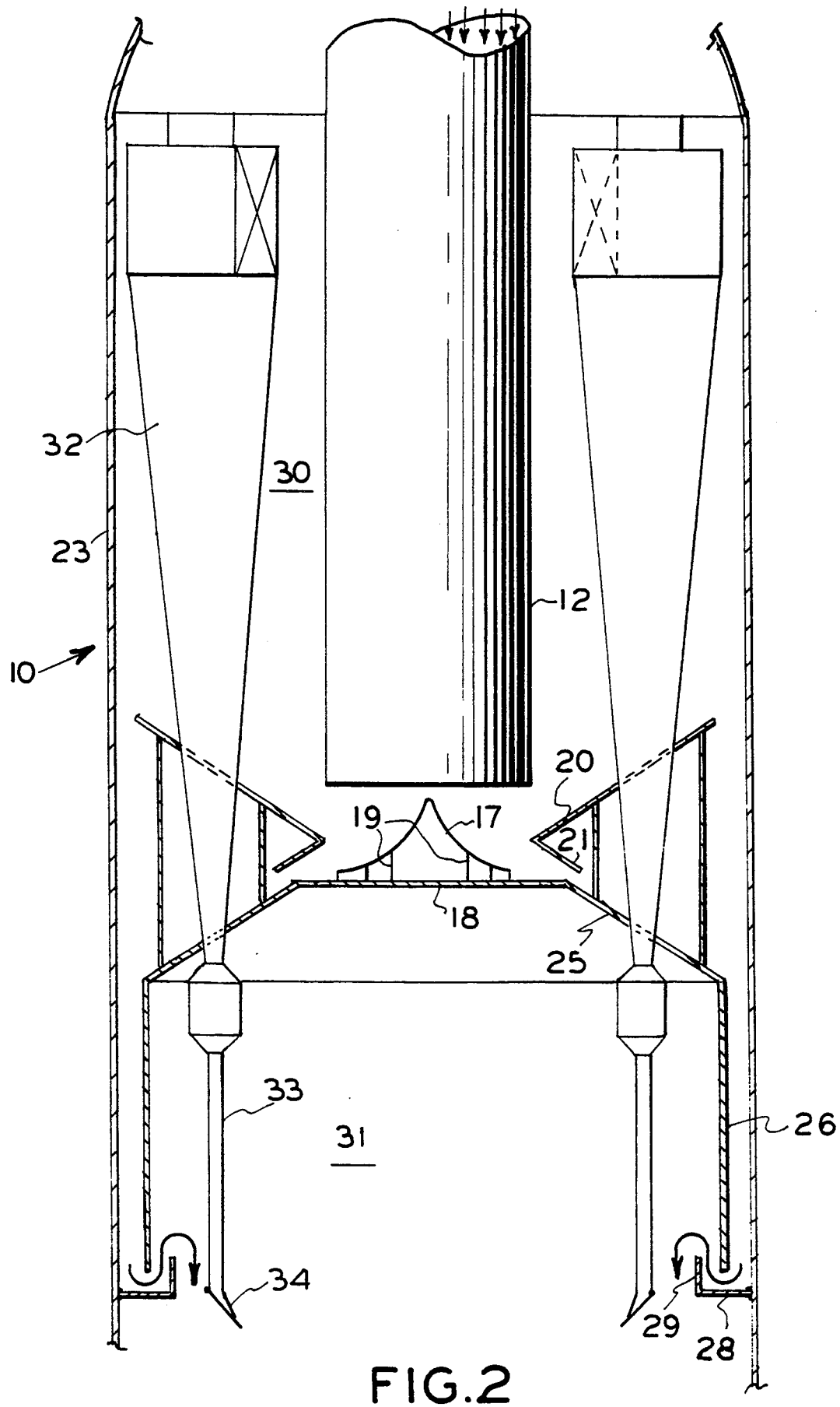
FIG. 2 is a schematic illustration of an alternate embodiment of the present invention, showing cyclones used in conjunction therewith.

In the embodiment shown in FIG. 2, vessel 10 is provided with at least one cyclone 32 which extends through baffle rings 20 and 25, so that the dipleg 33 and flapper valve 34 are located in bottom section 31 of vessel 10.

In the embodiment shown in FIG. 3, vessel 10 includes a cyclone 32 whose flapper valve 34 opens in the region immediately below baffle ring 20 and above ring 25.

In an alternate embodiment of the present invention, means are provided as shown in FIG. 4 for introducing a fluid radially outwardly through a slot defined by the base of cone 17 and platform 18, which is particularly useful in instances when the solids being separated tend to be sticky and pack easily. In the FIG. 4 embodiment, a fluid conduit 43 delivers a fluid to ring 41 which has a plurality of holes 42 in the circumference through which the fluid is ejected radially outwardly.

In operation, a stream of gas entrained solid is ejected downwardly from conduit 12 onto the flow streamlining deflector 17, which deflects the flow of material into a radially horizontal flow thereby imparting centrifugal and gravitational forces to the flowing stream such that the mixed phases substantially separate into a stream having a top and bottom layer. The top layer is the less dense or gas phase and the bottom layer is the more dense or solid phase. The more dense phase is directed by hydrodynamic sealing ring 21 downwardly onto the baffle ring 25 which sheds the solid for collection in the annular solids standpipe pipe 27. The less dense gas phase, which because of its momentum cannot penetrate the dense phase in-between sealing ring 21 and baffle 25, is guided upwardly by baffle 20 for collection in the separate section 30 for removal via conduit 16. Any entrained gas in the dense phase that separates after the dense phase is directed downwardly by ring 21 will pass upwardly through annular opening 24.

In the embodiment shown in FIGS. 2 and 3, the less dense phase in section 30 can first be introduced into cyclone 32 for removal of any residual entrained solids before exiting the vessel through a gas outlet connected to the cyclone gas discharge conduit.

While the present invention has been illustrated particularly by reference to a downward flow of entrained solids, it should be readily appreciated that the principles are equally applicable to flow in other directions, such as horizontal flow and vertically upward flow. Indeed, in the embodiment shown in FIG. 5, inlet conduit 12 extends vertically upwardly within the vessel for discharge of the stream into a flow reversal means for directing the flow exiting conduit 12 toward flow streamlining deflector 57. As can be seen, in one embodiment the flow reversal means comprises a cylindrical cap 55 that has a horizontal top 58 and a cylindrical sidewall 54, which are spaced apart from conduit 12 so that the fluid stream exiting conduit 12 will be deflected downwardly toward the flow streamlining deflector 57. Deflector 57 is an annular ring that has concave side walls that extend from conduit 12 downwardly and terminate radially outwardly. The diameter of deflector 57 at its base is from about 10% to about 20% greater than the diameter of conduit 12. Thus, in operation a stream of gas entrained solids is ejected upwardly from conduit 12. The upwardly flow is reversed downwardly by cap 55. Deflector 57 then deflects the flow into a radially horizontal flow, thereby imparting centrifugal and gravitational forces to the flowing stream such that the mixed phases substantially separate into a stream having a top layer and a bottom layer. The more dense phase is directed by hydrodynamic sealing ring 21 downwardly onto baffle ring 25, while the less dense phase is guided upwardly by baffle 20. Optionally, in this embodiment of the invention, a cone 53 is mounted on the underside of horizontal top 58 of cap 55 for assisting in reversing the flow to a downward direction.

Other variations of the present invention are readily achievable without departing from the spirit and scope of the invention described and claimed herein.

I claim:

1. A method of separating a mixture of two distinct fluid phases, one dispersed in the other, comprising:
    ejecting a stream of the mixed fluid phases from a conduit;
    deflecting the ejected stream radially outwardly by means of a substantially flow streamlining deflector, thereby imparting centrifugal and gravitational forces to the stream of mixed fluid phases to form a stream having a less dense phase top layer and a more dense phase bottom layer;
    hydrodynamically preventing the less dense phase from penetrating the more dense phase; and
    directly the less dense phase to flow upwardly into a first chamber and the more dense phase to flow downwardly into a second chamber.

2. The method of claim 1 wherein the mixture of distinct fluid phases comprises fluidizable solids in a carrier gas and wherein the mixed phases are ejected downwardly from the conduit.

3. The method of claim 1 wherein the mixture of distinct fluid phases comprises fluidizable solids in a carrier gas and wherein the mixed phases are ejected upwardly from the conduit.

4. An apparatus for separating a mixture of two distinct fluid phases comprising:
    a vessel having a first chamber and a second chamber;
    conduit means for introducing a flowing stream of a mixture of two distinct fluid phases into the vessel;
    a flow streamlining deflector for directing the flowing stream introduced into the vessel radially outwardly to form a stream having a top layer of a less dense phase and a bottom layer of a more dense phase;
    a sealing ring which hydrodynamically seals the less dense from more dense phase and which directs the more dense phase to flow downwardly into the second chamber; and, a baffle which directs the less dense phase to flow into the first chamber.

5. The apparatus of claim 4 wherein the flow streamlining deflector has an apex and a base, is substantially conical in shape and has concave sidewalls which face radically outwardly at the base.

6. The apparatus of claim 5 wherein the apex of the deflector is coaxially aligned with the centerline of the conduit and positioned at the opening of the conduit and wherein the diameter of the base of the deflector is equal to or 20% greater than the diameter of the conduit.

7. The apparatus of claim 6 wherein the deflector is mounted on a horizontally disposed platform having a diameter less than the vessel diameter and equal to or about three times greater than the diameter of the conduit, and wherein a baffle ring extends downwardly and outwardly from the platform to a concentric cylindrical member within the vessel.

8. The apparatus of claim 7 including a baffle ring extending upwardly and outwardly from a first end positioned at a point spaced above the base of the cone to a point spaced from the body of the vessel and wherein the sealing ring extends downwardly and outwardly from the first end of the baffle ring for a predeterminate distance.

9. The apparatus of claim 4 wherein the flow streamlining deflector is an annular ring with a top and a base and which extends from the top downwardly and outwardly from the conduit means and in substantially concave fashion and facing radially outwardly at the base.

10. An apparatus for separating a mixture of two distinct fluid phases comprising:
    a vessel having a cylindrical body including a first chamber and a second chamber;
    a conduit introducing a flowing stream of a mixture of two distinct fluid phases into the vessel;
    a flow streamlining lining deflector for directing the flowing stream radically outwardly to form a stream having a top layer of a less dense phase and a bottom layer of a more dense phase, the deflector being substantially conical in shape and having an apex, concave side walls and a base, the apex positioned at the opening of the conduit at the centerline thereof, the base having a diameter equal to or 20% greater than the diameter of the conduit;

a horizontally disposed platform on which the deflector is mounted, the platform having a diameter equal to or up to three times the diameter of the conduit but less than the diameter of the vessel;

a concentrical cylindrical member within the vessel below the platform;

a first baffle ring extending downwardly and outwardly from the platform to the cylindrical member;

a second baffle ring extending upwardly and outwardly from a first end positioned at a point spaced above the base of the deflector to a point spaced from the cylindrical body of the vessel;

a sealing ring extending downwardly and outwardly from the first end of the second baffle ring to a point beyond the platform and defining a passageway therebetween.

11. An apparatus for separating a mixture of two distinct fluid phases comprising:

a vessel having a cylindrical body including a first chamber and a second chamber;

a cylindrical conduit vertically disposed in the vessel for introducing a flowing stream of a mixture of two distinct phases upwardly into the vessel;

means for reversing the flowing stream to a downward direction;

a flow streamlining deflector for directing the downwardly flowing stream radially outwardly to form a stream having a top layer of a less dense phase and a bottom layer of a more dense phase, the deflector being an annular ring with a top and a base, the ring extending from the top downwardly and outwardly from the conduit in substantially concave fashion and facing radially outwardly at the base, the base having a diameter of from about 10% to about 20% greater than the diameter of the conduit;

a horizontally disposed platform below the streamlining deflector through which the conduit passes, the diameter of the platform being less than that of the vessel diameter;

a concentrical cylindrical member within the vessel below the flow streamlining deflector;

a first baffle ring extending downwardly and outwardly from the platform to the cylindrical member;

a second baffle ring extending upwardly and outwardly from a first end positioned at a point spaced above the base of the deflector to a point spaced from the cylindrical body of the vessel;

a sealing ring extending downwardly and outwardly from the first end of the second baffle ring to a point beyond the platform and defining a passageway therebetween.

* * * * *